March 6, 1956
S. H. EDGE ET AL
2,737,021
CONTROL VALVE ACTUATING MEANS
FOR POWER-ASSISTED
STEERING MECHANISM
Filed July 18, 1952
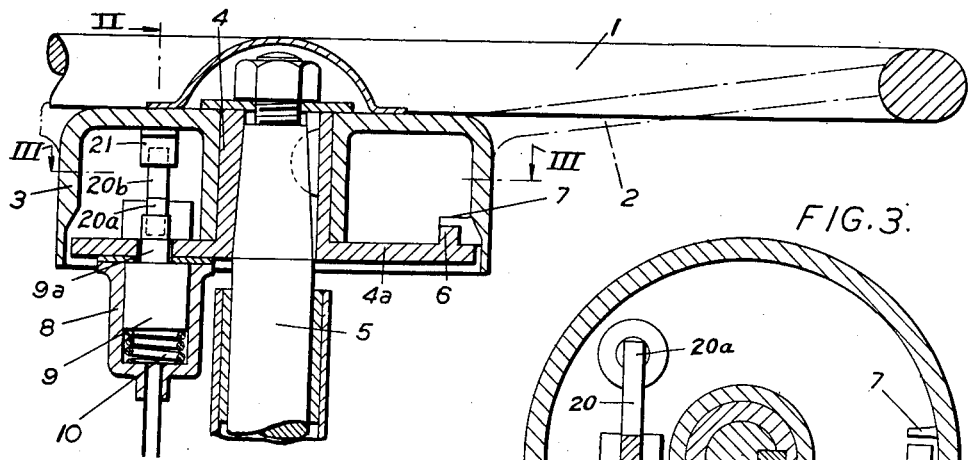
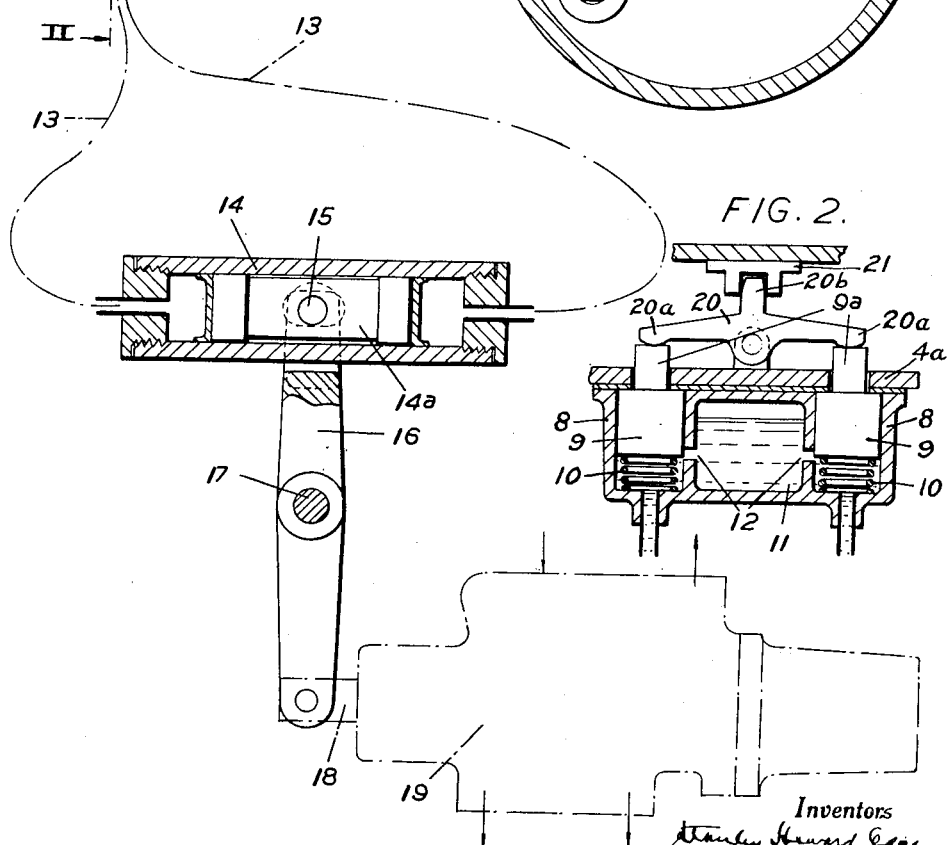

United States Patent Office 2,737,021
Patented Mar. 6, 1956

2,737,021

CONTROL VALVE ACTUATING MEANS FOR POWER-ASSISTED STEERING MECHANISM

Stanley Howard Edge, Danesgate, Lincoln, and Frederick Henry Heacock and Douglas Leonard Geoffrey Young, Lincoln, England, assignors to Clayton Dewandre Company Limited, Lincoln, England, a British company Application July 18, 1952, Serial No. 299,713

7 Claims. (Cl. 60—54.5)

This invention relates to power-assisted steering mechanism for motor vehicles and of the kind wherein the application of power assistance is under control of a valve having an operating member the direction of displacement of which determines the direction in which power assistance is applied and which valve is preloaded to the neutral position.

The object of the present invention is to provide new or improved means for actuating the steering or control valve which can be embodied in the steering assembly without any material alteration thereof other than the use of a modified steering wheel structure.

According to the invention the improved arrangement comprises a steering wheel fast with an outer hub member which is supported so as to be capable of limited angular movement relative to an inner hub member fast with the steering column shaft, a double-acting hydraulic remote control mechanism of which the master unit is mounted in association with said hub members whilst the slave unit is arranged to act directly or indirectly upon the actuating member of the steering or control valve, and means carried by the hub members and operable upon relative angular movement of these members to actuate the master unit and effect an appropriate setting of said steering or control valve.

Preferably, additional loading means are provided for opposing relatively angular displacement of the steering wheel and steering column shaft to provide a convenient means of varying the preloading of the system to suit individual requirements whilst retaining a valve unit that is completely interchangeable for all applications.

Reference will now be made to the accompanying drawings which illustrate a preferred form of the invention and wherein:

Fig. 1 shows the arrangement in sectional elevation,
Fig. 2 is a longitudinal section through the hydraulic master unit on the line II—II in Fig. 1, and
Fig. 3 is a cross section on the line III—III of Fig. 1.

As shown, the steering rim 1 is rigidly connected by the usual arms 2 to an outer hub member 3 which is of annular form and of inverted channel section and this member is rotatably mounted upon an inner hub member 4 which is secured fast on the upper end of the steering column shaft 5 and includes a horizontal web or disc portion 4a which closes the lower side of the outer hub member 3. A stop 6 on one of these hub members and located between spaced abutments 7 on the other of said members serves to limit relative angular movement between them.

Secured to the underside of the hub disc 4a is a master hydraulic unit consisting of two vertically disposed cylinders 8 each having a sliding close fitting plunger 9 therein, said plungers being urged by springs 10 to their uppermost position and each having a stem 9a which projects upwards through an aperture in the hub disc 4a. The unit also includes a reservoir 11 which communicates with each of the cylinders 8 through a transfer port 12 which is covered by the piston immediately the latter commences to descend from its uppermost position. The lower ends of the cylinders communicate respectively and through flexible pipe lines 13 with the opposite ends of a double acting hydraulic slave unit 14 which is arranged to actuate the operating member of the control or steering valve in any convenient manner. In the example shown, the movements of the plunger 14a of said unit are transmitted through a cross head pin 15 to one end of a double-armed lever 16 pivotally mounted at 17, the other end of said lever being connected to the operating member 18 of the steering valve which is indicated diagrammatically at 19 and which controls the flow of pressure fluid to the power cylinder or cylinders acting on the steering mechanism. Alternatively, the slave unit may be embodied in the housing of the slave unit such that the plunger 14a may act directly upon the operating member of the valve.

Located within the hub structure and pivotally mounted upon the inner hub disc 4a is a three-armed lever 20, two opposed arms 20a of this lever engaging respectively the stems 9a on the plungers of the master hydraulic unit whilst the third arm 20b engages within a slotted member 21 secured to the outer hub 3. When no steering torque is being applied to the steering wheel the two hydraulic plungers 9a are urged to their upper limit by their loading springs and, acting through the three armed lever 20 and the outer hub 3, hold the steering wheel at the mid-position of its total available travel relative to the steering column shaft as shown in Fig. 1. If now a steering torque is applied to the steering wheel, the outer hub 3 will tend to move relative to the inner hub 4 and the three-armed lever 20 will tend to depress the plunger 9a appropriate to the direction of torque. The value of the steering torque at which this plunger movement commences will depend initially upon the degree of spring loading on the plunger whilst after closure of the associated transfer port 12 continued plunger movement will call for added effort to overcome steering valve friction and the preloading means which urge the steering valve to the neutral position. The total preloading of the system determines the value of the steering torque below which no power assistance is introduced.

The control or steering valve 19 and the double acting hydraulic slave unit 14 may be mounted further down the steering column or at any other suitable or convenient point relative to the steering assembly, and if desired, the steering or control valve may incorporate reaction means in order to demand a manual steering effort that increases with increasing operating pressure.

Thus the invention provides novel and compact steering valve actuating means which can be embodied in an existing steering layout without modification of the steering box and steering column assembly and which permits the power cylinder or cylinders and the control or steering valve to be located at the most desirable or convenient point in relation to the steering assembly.

We claim:

1. Control valve actuating means for power-assisted steering mechanism for motor vehicles having a steering wheel, a steering column shaft, and a steering control valve having an operating element controlled by the steering wheel, comprising an inner hub member fixed to the steering column shaft, an outer hub member fixed to the steering wheel and rotatable therewith relative to the inner hub member, a double-acting hydraulic remote control mechanism comprising a master hydraulic unit mounted on one of said hub members and having a pair of cylinders and plungers operative therein, and a slave unit connected hydraulically to the cylinders of the master unit and operative upon the operating element of the steering control valve in response to fluid pressure produced by actuation of said plungers, and means carried by the hub members and operable in response to relative rotation between said members to actuate the plungers of the master unit and thereby effect appropriate setting of the steering valve.

2. Control valve actuating means as defined in claim 1, wherein said means to actuate the plungers of the master unit comprise co-operating abutment means on the inner and outer hub members for limiting relative rotation between said members.

3. Control valve actuating means as defined in claim 1, wherein said outer hub member is of hollow annular form and is rotatably mounted on said inner hub member, and said inner hub member includes a disc-like web portion which closes the lower side of the outer hub member, and wherein said master unit is supported on the underside of said web portion and the actuating means for the plungers of the master unit is enclosed by said hub members.

4. Control valve actuating means as defined in claim 1, wherein said slave unit comprises a double-acting plunger and cylinder device, and including a cross head connected to said plunger of the slave unit, and a lever connected to the cross head and to the operating element of the steering valve.

5. Control valve actuating means as defined in claim 1, wherein the cylinders of said master unit are hydraulically connected respectively to the opposite ends of said slave unit, and said plungers comprise spring-loaded pistons movable in the respective cylinders, and including a multi-armed lever pivoted on the inner hub member for rocking movement by relatiive rotation between the inner and outer hub members to engage and actuate the respective pistons.

6. Control valve actuating means as defined in claim 5, including a casing in which said cylinders of the master unit are formed, and a fluid supply reservoir in the casing, the casing having ports which provide communication between the reservoir and the respective cylinders, each of said ports being positioned to be closed by the respective piston immediately upon commencement of its operating stroke.

7. Control valve actuating means as defined in claim 5, wherein said pistons of the master unit are loaded by springs which act through said multi-armed lever and constitute pre-loading means for opposing relative rotation between the steering wheel and the steering column shaft.

References Cited in the file of this patent

UNITED STATES PATENTS

| | | |
|---|---|---|
| 404,472 | Dunn | June 4, 1889 |
| 976,907 | Pagendarm | Nov. 29, 1910 |
| 1,340,727 | MacGregor | May 18, 1920 |
| 1,375,678 | Crum | Apr. 26, 1921 |
| 1,429,101 | Ross | Sept. 12, 1922 |
| 1,577,579 | Hirschler | Mar. 23, 1926 |
| 1,925,000 | Mullins | Aug. 29, 1933 |
| 2,411,119 | Stephens | Nov. 12, 1946 |

FOREIGN PATENTS

| | | |
|---|---|---|
| 380,854 | Italy | June 7, 1940 |